US011973777B2

United States Patent
Pi et al.

(10) Patent No.: US 11,973,777 B2
(45) Date of Patent: Apr. 30, 2024

(54) KNOWLEDGE GRAPH FOR REAL TIME INDUSTRIAL CONTROL SYSTEM SECURITY EVENT MONITORING AND MANAGEMENT

(71) Applicants: Siemens Aktiengesellschaft, Munich (DE); Washington State University, Pullman, WA (US)

(72) Inventors: Jiaxing Pi, Weehawken, NJ (US); Dong Wei, Edison, NJ (US); Leandro Pfleger de Aguiar, Robbinsville, NJ (US); Yinghui Wu, Pullman, WA (US)

(73) Assignees: Siemens Aktiengesellschaft, Munich (DE); Washington State University, Pullman, WA (US)

( * ) Notice: Subject to any disclaimer, the term of this patent is extended or adjusted under 35 U.S.C. 154(b) by 575 days.

(21) Appl. No.: 17/258,291

(22) PCT Filed: Jul. 9, 2019

(86) PCT No.: PCT/US2019/040933
§ 371 (c)(1),
(2) Date: Jan. 6, 2021

(87) PCT Pub. No.: WO2020/014181
PCT Pub. Date: Jan. 16, 2020

(65) Prior Publication Data
US 2021/0273965 A1    Sep. 2, 2021

Related U.S. Application Data

(60) Provisional application No. 62/695,317, filed on Jul. 9, 2018.

(51) Int. Cl.
*H04L 9/40*    (2022.01)
*G06N 5/02*    (2023.01)
(Continued)

(52) U.S. Cl.
CPC .......... *H04L 63/1425* (2013.01); *G06N 5/02* (2013.01); *G06N 20/00* (2019.01); *H04L 41/064* (2013.01); *H04L 41/22* (2013.01)

(58) Field of Classification Search
CPC ... H04L 63/1425; H04L 41/064; H04L 41/22; H04L 41/0631; H04L 41/145;
(Continued)

(56) References Cited

U.S. PATENT DOCUMENTS

| 7,737,857 B2 * | 6/2010 | Ebert | H04L 67/12 340/572.1 |
| 2013/0332490 A1 * | 12/2013 | Hu | G06N 5/02 707/798 |

(Continued)

FOREIGN PATENT DOCUMENTS

| EP | 3206368 A1 * | 8/2017 | ............. G06N 20/00 |
| EP | 3206368 A1 | 8/2017 | |

OTHER PUBLICATIONS

Yu, Y. and J. Heflin; "Extending Functional Dependency to Detect Abnormal Data in RDF Graphs"; ISWC; 2011.
(Continued)

*Primary Examiner* — Mohammed Waliullah

(57) ABSTRACT

Methods and systems are disclosed for security management in an industrial control system (ICS). An event entity detection and linking module generates a model for a plurality of event entities extracted from a plurality of different data sources including one ICS data source and one IT data source. The model encodes a set of linked event entities and their relationships, each event entity associated with a vector of attribute value pairs. A data standardization of domain knowledge includes translating, by a machine learning application, extracted knowledge base information to rules for the constraints and using the rules to validate the constraints and to add new constraints. A fusion module (Continued)

performs temporal correlation detection across data streams of the different data sources for establishing causality between triplets of association models within a defined time span.

14 Claims, 5 Drawing Sheets

(51) Int. Cl.
*G06N 20/00* (2019.01)
*H04L 41/0631* (2022.01)
*H04L 41/22* (2022.01)

(58) Field of Classification Search
CPC .......... G06N 5/02; G06N 20/00; G06N 5/01; G06N 5/022; G06N 5/025; G06N 20/20; G06F 21/552; G06F 21/566; G06F 21/562
See application file for complete search history.

(56) References Cited

U.S. PATENT DOCUMENTS

| | | | | |
|---|---|---|---|---|
| 2014/0074762 | A1* | 3/2014 | Campbell | G06Q 40/00 706/46 |
| 2017/0142140 | A1 | 5/2017 | Muddu et al. | |
| 2017/0237752 | A1* | 8/2017 | Ganguly | H04L 63/1416 726/25 |
| 2018/0103052 | A1* | 4/2018 | Choudhury | H04L 63/20 |
| 2018/0332063 | A1* | 11/2018 | Ford | H04L 67/535 |

OTHER PUBLICATIONS

Bertossi, L.E., S. Kolahi, and L.V.S. Lakshmanan; "Data Cleaning and Query Answering with Matching Dependencies and Matching Functions"; TCS, 2013. 52(3): p. 441-482.

Lin, P.S., Qi; Wu, Shen,Jialiang; Wu, Yinghui,; "Discovering Graph Patterns for Fact Checking in Knowledge Graphs"; 23rd International Conf. on Database Systems for Advanced Applications. 2018.

Ganti, V. and A.D. Sarma "Data Cleaning: A Practical Perspective"; 2013: Morgan & Claypool Publishers.

Fan, W., Y. Wu, and J. Xu. "Functional dependencies for graphs. in SIGMOD"; 2016.

Alakari, A., K.F. Li, and F. Gebali; "Complex event processing enrichment: Motivations and challenges"; in Communications, Computers and Signal Processing (PACRIM), 2017 IEEE Pacific Rim Conference on. 2017. IEEE.

Wu, Y., et al., "Toward computational fact-checking" PVLDB, 2014.

Cugola, G. and A. Margara, "Processing flows of information: From data stream to complex event processing"; ACM Computing Surveys, vol. 44, No. 3, Article 15, Publication date: Jun. 2012.

Fan, W., F. Geerts, and X. Jia; "A revival of integrity constraints for data cleaning"; Proceedings of the VLDB Endowment, 2008. 1(2): p. 1522-1523.

Gupta et al.; "Outlier Detection for Temporal Data: A Survey" IEEE Transactions on Knowledge and Data Engineering, vol. 25, No. 1, Jan. 2014.

Nguyen, Hai-Long et al: "A survey on data stream clustering and classification", Knowledge and Information Systems, Springer Verlag,London, GB, vol. 45, No. 3, Dec. 17, 2014 (Dec. 17, 2014), pp. 535-569, XP035602966 / Dec. 17, 2014.

International Search Report dated Oct. 14, 2019; International Application No. PCT/US2019/040933; Filing Date: Jul. 9, 2019; 5 pages.

* cited by examiner

KNOWLEDGE GRAPH FOR REAL TIME INDUSTRIAL CONTROL SYSTEM SECURITY EVENT MONITORING AND MANAGEMENT

TECHNICAL FIELD

This application relates to network security. More particularly, this application relates to modeling an industrial control system in real time for security events.

BACKGROUND

Most Industrial Control Systems (ICS) have been historically designed to operate isolated from other systems, with the "air-gap" as a standard approach to provide security. However, Information Technology (IT) and Operations Technology (OT) networks have been converging to enable additional use cases on monitoring and management of the industrial process. Due to aspects like vertical integration of the production systems and horizontal integration of the value chain, ICS networks are often directly or indirectly connected to IT networks (e.g., an office network) and the Internet, hence offering an opportunity for cyber attackers to penetrate such environments and exploit any existing vulnerabilities. Attacks targeting the ICS network can cause significant economic loss, human casualties and national security threatening incidents.

ICS produces a large amount of data from different sources, such as network traffic, logs from various systems, sensors and actuators. Hacking into an ICS might leave traces across different layers of IT/OT infrastructures. An attacker normally needs to gain access to a corporate computer to explore the vulnerability, take control of ICS control component by changing the configuration of target devices and eventually change the control logic to disrupt the production which is monitored and controlled by ICS. Analyzing alerts and information generated from different layers often requires the collaboration between different domain experts and is usually time-consuming to link the information from different data sources, while responses to security incidents are often time sensitive.

Due to the complexity of ICS, the security system should not only rely on single statistical and learning models, but should be adaptive to change of context, coherent to system status, and holistic by integrating heterogeneous data stream sources. In this invention, we aim to develop a framework that supports online data processing, query and reasoning for ICS security events. The lightweight knowledge base is particularly designed to harvest knowledge from multiple, heterogeneous data packets in ICS, including data from both information technology (IT) domain and operation technology (OT) domain with different types of data format.

In process control, Programmable Logic Controllers (PLCs) are the key components that collect data from field devices, process, and control field actuators. Through unauthorized access to a PLC, attackers might directly change process variables and, thus manipulate field devices. Skilled attackers can hide their actions under the normal network traffic levels and use legitimate systems to alter PLC control logic. Advanced Persistent Threats (APTs) carefully designed by highly motivated top experts, sometimes with extended resources sponsored by nation states, might create additional challenges from a detection perspective because they have a specific purpose and can run for a long time without being discovered. Such sophisticated cyber-attacks aimed at ICS devices are often intentionally camouflaged under normal network traffic and hidden inside legitimate systems with methods that avoid detection by existing signature based malware detection methods. Currently existing security controls have proven to be insufficient for such threats, especially in the case of the process level attacks. Other ICS systems such Distributed Control Systems (DCS), motion controllers, Supervisory Control and Data Acquisition (SCADA) servers, and Human Machine Interfaces (HMIs) offer additional challenges when it comes to deploying security measures.

Recent innovative approaches developed to improve the detection space in industrial systems include the ability to detect deviations on values observed from I/O process variables (i.e., sensor and actuator values) and to model the process trend data based on neural networks or autoregressive models. Current intrusion detection solutions focus mostly on a single source of data, such as IT data or process variable data, and lack the capability to combine the useful information across IT and OT. A majority of the commercial security software for ICS are directly migrated from IT domain and focus on analyzing the network traffic, log information from various systems, asset information, etc. Efforts to analyze the control system semantic data have been recently studied and tested to discover the anomalies based on value deviation from the system baseline. Those previous methods might suffer from one or more of the following issues when monitoring production process variables (such as temperature, pressure, actual motor speed, command to solenoid, setting of proportional valves).

Such methods may lack an ability to support real-time situation awareness for complex events and a failure to correlate detected deviations on a given process with anomalies observed from other data sources. For example, when one process variable starts a pattern change, it is difficult to determine if this is caused by an external stimulus to the environment such as a cyberattack, or by a naturally expected process behavior. This happens because different monitoring domains (e.g. security, network performance, production process) are monitored independently and lack a unified format to share the information. Analyzing alerts generated from IT and OT often requires the collaboration between different domain experts and is time-consuming to link the information from different data sources, while responses to security incidents are often time sensitive.

Such methods may be unable to provide further root cause analysis without knowing the causal relationships between process variables or information from different layers a priori. Without the ability to link different types of security incidents, context-rich analysis is not possible. For example, in a water tank storage system, if the water pressure variables and valve status are monitored independently and valve is not working properly, it is hard to tell whether the sensor for pressure monitoring or the valve should be investigated since water pressure will be impacted due to the valve malfunction.

Such methods may lack the ability to generalize their analytical methods to different cyber-physical systems. Each monitoring method is particularly designed for a particular physical system. For example, the physical model for energy management system cannot be used for manufacturing system. Also, constructing multiple specific systems demands specific knowledge from topic matter experts and thus, might be expensive and time consuming.

Such methods may also lack an actionable interpretation mechanism of data-driven models. For example, while a typical data driven approach can generate an anomaly score by continuously monitoring the process variable trend, it is still difficult for an operator to take timely action based on the score alone without additional context.

Prior machine learning methods using ICS data may contain gaps such as lack of support for domain knowledge of event models, and lack of support for real-time detection. Hardcoded rules and outlier detection with predefined distance measures, on the other hand, are often not scalable due to the overwhelming amount of time necessary to encode the physical properties of the process.

SUMMARY

A proposed framework develops a novel class of lightweight ontological knowledge fusion, extraction, and provenance techniques that construct and maintain a knowledge base over fast ICS data exchanges. A heterogeneous knowledge base consists of critical event and signal entities and their semantic relationships. This framework includes online event and signal detection modules that combine real-time data stream learning and incremental query processing, to extract and fuse values of complex event entities on-the-fly, merging event detection processes of ICS and IT data streaming domains. The framework further includes an online fact checking module that exploits context patterns to identify relationships of the knowledge base, codified under open-world assumption (OWA). A question-and-answer user interface is also provided to allow a user-friendly exchange between the framework and an operator during online model development for validation of correlations.

Methods and systems are disclosed for security management in an industrial control system (ICS). An event entity detection and linking module generates a model for a plurality of event entities extracted from a plurality of different data sources including one ICS data source and one IT data source. The model encodes a set of linked event entities and their relationships, each event entity associated with a vector of attribute-value pairs. A data standardization of domain knowledge includes translating, by a machine learning application, extracted knowledge base information to rules for the constraints and using the rules to validate the constraints and to add new constraints. A fusion module performs temporal correlation detection across data streams of the different data sources for establishing causality between triplets of association models within a defined time span.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Methods and systems are disclosed for security monitoring and assessment of heterogeneous data in a large-scale Industrial Control System. While currently available tools may detect an anomaly based on deviations on values observed from process variables of a sensed measurement or an actuator value, monitoring of production process specific data fails to link event entities across diverse data streams. Knowledge graphs are constructed for various data streams according to enforcement of conditional functional dependencies to resolve detected inconsistencies. Real-time temporal correlation is applied to evolving ICS data as a fact-checking mechanism that detects expired data or relational decay of spatial-temporal-ontological models, by enforcing temporal association rules. A user-friendly question-and-answer interface is configured to automatically rewrite user queries as counterpart queries reformulated to enable the computer to retrieve information relevant to event models. Accordingly, this enhanced interface can provide the user with an understanding of underlying physical relationships between an event and correlated signals or event entities, as well as answers to why particular signals or event entities were not correlated to a modeled event.

Figure 1:
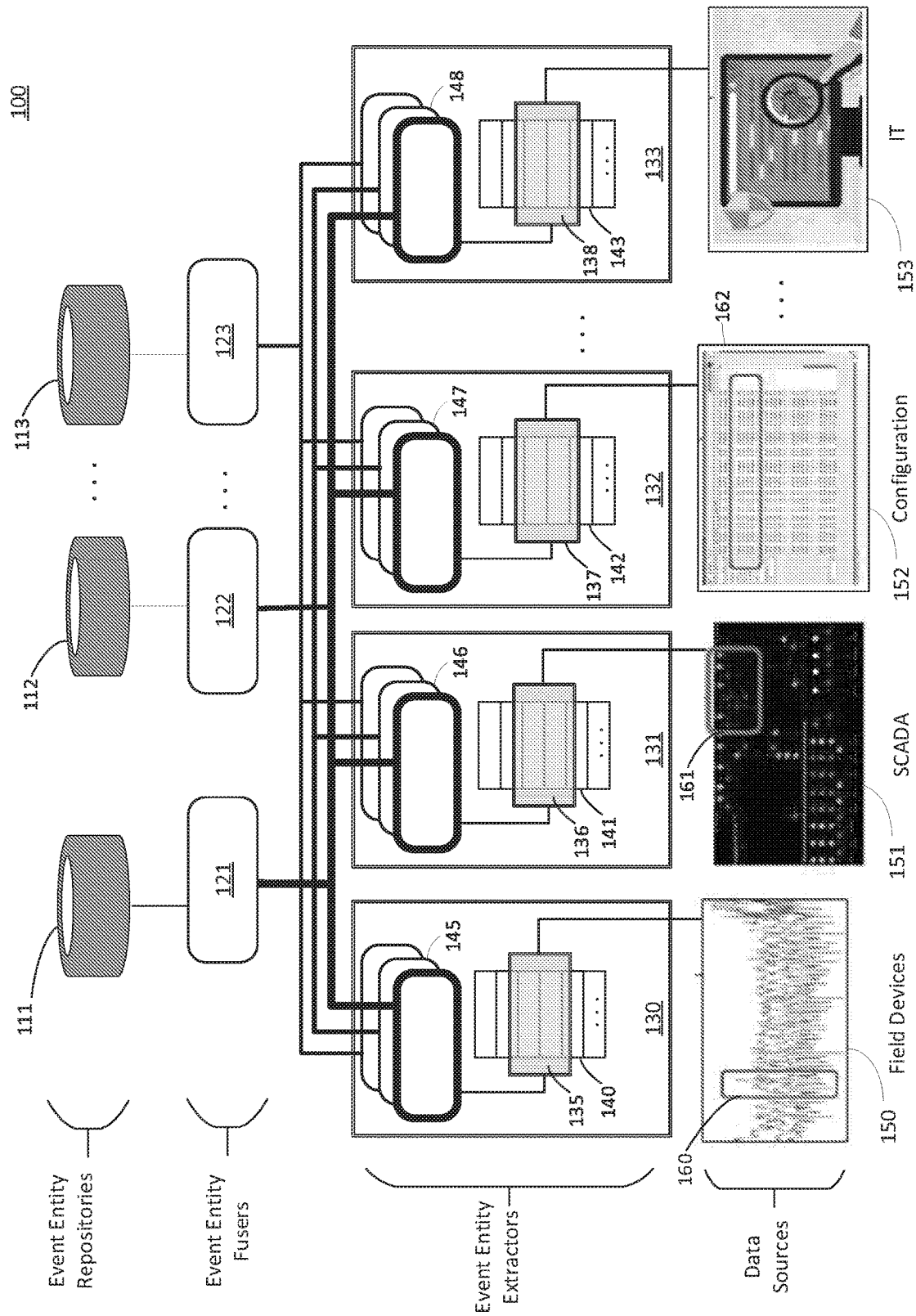
FIG. 1 shows a flowchart diagram for an example of an event entity extraction and fusion process for an Industrial Control System according to embodiments of this disclosure.

FIG. 1 shows a flowchart diagram for an example of an event entity extraction and fusion process for an Industrial Control System according to embodiments of this disclosure. Fast detection and response to complex events is critical to ICS applications. A complex event is a linked representation of critical factors and their context-sensitive correlation. In an embodiment, events are modeled by outliers, where the goal is to find data objects that are significantly different from the majority for given time or distance measures. Such detection of outliers are considered to be potential security events. A framework 100 as shown in FIG. 1 applies incremental querying and real-time learning techniques to retrieve and predict the values of critical signals from various diverse data streams to construct complex event entities. As an example of event detection, a signal is detected at time t, from a sensor at a location L. In an embodiment, an event entity may be automatically generated based on detected patterns of signals and sensors within a particular time span using rules and constraints applied to graphical models of linked event entities. For example, extracted graphical models of entity nodes linked by relation may be monitored across a series of time intervals to detect patterns of subgraphs to reveal potential events. More particularly, if 10 out of 12 times, a particular subgraph pattern is observed for linked event entities, then on the occasion that the expected subgraph is not present, an alert may be triggered based on the data inconsistency.

The framework 100 implements standardization of heterogeneous ICS data streams and real-time ICS event entity linking. For example, heterogeneous data streams 140, 141, 142, 143 may be monitored as received from various and diverse data sources from a combination of the ICS and the IT system, which may include field devices 150, SCADA data sources 151, configuration files 152 of the ICS, and security data sources 153 (e.g., internet traffic, firewall log, and the like) of the IT system, among others. Each single source data stream includes heterogeneous data in that the signals from sensors vary across different data domains. For example, field device data stream 140 may include information related to various production process variables (such as temperature, pressure, actual motor speed, command to solenoid, setting of proportional valves, device state). Similarly, each of data streams 141, 142 and 143 may include heterogeneous data across various data domains. The desired linking may identify how a potential security event may manifest itself across the multitude of monitored data streams 140, 141, 142, 143, including considerations to time delays of reaction time between relational event entities. To correlate data from such diverse data sources, 150, 151, 152 and 153, framework 100 applies a linked data model to represent an ICS data thesaurus and instances in a knowledge graph database. Data standardization for the linked data model consists of translating data into a common format. For example, properties associated with an entity node may be summarized by a numerical value, location and functionality and the node may be linked to other nodes of a similar domain type (e.g., time series data node linked to other time series data nodes). The standardized data for each node may include domain information and statistical analysis information. As another example, a server entity (e.g., a cyber asset) may be summarized by entity property information such as IP address, packets sent, and packets received.

The standardization schema is designed for a knowledge graph, for example, instead of using a sensor table that records all the signal values. In the knowledge graph schema, monitoring algorithm results are reported and outputs whether there is an anomalous event or not. For example, an entity A is a sensor having a property of signal B and is linked to a special event that is created by a rule-based algorithm.

The proposed model for each event entity is a collection of triples that encodes a set of linked event entities and their relationships, stored in event entity repositories 111, 112, 113. Each event entity is associated with a type (e.g., an ontology), and a vector of attribute-value pairs. Notable attributes may include data sources, the origin devices, signal name, location or time. Each triple <subject, predicate, object> encodes a subject entity, an object entity and their relation, such as the following example:

<PMU$_1$, isLocateAt, Position$_2$> where the subject entity PMU$_1$ is a phase measurement unit, the predicate isLocateAt is a location relationship to the object Position$_2$. The subject entity PMU$_1$ may have attributes such as phase and timestamp that records its phase reading at specific timestamp.

In contrast to rigid data models such as a relational database stored as tables, two entities may have different sets of attribute-value pairs, according to their data heterogeneity. Hierarchical typing systems can be associated to characterize ontologies of ICS data objects. To further improve data interoperability, integrity and semantic constraints, originally defined for relational data by each of the individual event entity extractors 130, 131, 132, 133, may be extended to multi-source data by the event entity fusers 121, 122, 123 to ensure the consistency and improve data completeness at both attribute (i.e., meta-data) level and instance level. Relevant information 135, 136, 137, 138 is extracted from respective data streams 140, 141, 142, 143. For example, event entity extractor 130 may extract relevant event entity information 135 from data stream 140 of data source 150 and return a set of event entity models 145. Likewise, another set of event entity models 146 is returned by event entity extractor 131 from a different data source 151. The event entity fuser 121 identifies related event entity models from the multi-source sets 145 and 146 and fuses multi-source relational data to be stored in event entity repository 111. Other fusion variations are possible by any one of the event entity fusers 121, 122, 123, each of which linking two or more event entity models from the event entity model sets 145, 146, 147, 148 within defined time durations established according to data correlation algorithms as described below.

Process 100 enables detection of data inconsistency, which may be caused by signal noise. Semantic constraints may be enforced on linked, heterogeneous entity attributes and values according to referential integrity and conditional functional dependency. For example, a referential integrity may be provided as follows:

PMU.location⊆substation.location which states that "the location of any PMU must be from the locations of some substation"; and a conditional functional dependency may be provided as follows:

Meter.[time,location]=Meter.read which asserts that the readings of meters [Meter.read] at same specific time and close location should be the same for any two meters. With respect to referential integrity, this information is monitored to detect data inconsistency, where if a data mismatch is detected, the information may be corrected automatically, or an alarm may be triggered to permit an operator to take corrective action. For the conditional functional dependency statement, two event entities violate the conditional functional dependency if the values satisfy the left-hand-side condition (e.g., both entities are meter readings of the same time instance and in locations of close proximity) but violate the right-hand-side constraint (e.g., the two values of meter readings are not equivalent). A baseline is learned through either domain expertise or statistical analysis before the algorithm is executed to detect inconsistencies. Once the baseline is learned, these constraints are applied to identify inconsistencies as potential ICS system attacks or failures, which may be resolved by removing linked attribute-value pairs or updating values with minimum editing cost.

As an option to increase the efficiency for establishing the baseline learning and to augment a data driven approach, available domain knowledge from a domain knowledge base about a particular form of ICS data (e.g., system design engineering documentation, or P&ID diagrams) can be translated to standardized data. For example, a design engineer of a production process typically documents details of the process in the form of a P&ID diagram during the design phase of the ICS. Although no formal language exists to write/read a P&ID diagram, a machine learning application, or a domain expert, or both, can extract the information from the diagram of the domain knowledge base. As an example, a machine learning algorithm that analyze existing process data can suggest rules. Accordingly, the process engineer or the expert system may use the P&ID diagrams to validate and write additional rules. Once the data is standardized, it may be used for enhancing the performance of the event entity fusers 121, 122, 123 (e.g., graph construction), the operation of which is explained further below.

Returning to FIG. 1, an extraction by event entity extractor 130, 131, 132, 133 is posed whenever the values of particular signals 140, 141, 142, 143 are needed for complex event detection. For example, given a set of signals $p_1, \ldots, p_k$, and a set of sensors $s_1, \ldots, s_n$, an event entity extractor returns a set of triples, where for each triple with subject i and object j, information $<o_{ij}, c_{ij}>$ states the value $o_{ij}$ of signals $p_i$ reported by sensor $s_j$, with a confidence score $c_{ij}$ indicating the likelihood the value $o_{ij}$ is accurate. The confidence score can be learned by reported deviations from a baseline established by history and sensor log data of normal operations. A signal $p_i$ could represent, for example, an IT alarm signal from data stream 153, reported by an IT asset sensor $s_j$.

The outputs 145, 146, 147, 148 from multiple extractors 130, 131, 132, 133 are redirected to an entity linking process performed by event entity fusers 121, 122, 123, which implement online knowledge fusion to link values for event entities. In an embodiment, each fuser 121, 122, 123 includes a real-time ensemble learner that trains multiple classifiers over multi-source heterogeneous data streams. For example, various algorithms may be deployed to report results, and an integration of the results may ascertain a true value from a set of uncertain ones with high probability. The entity linking for event entities is dynamically updated through machine learning techniques, such as incremental learning. In an embodiment, each fuser 121, 122, 123 implements a class of incremental temporal correlation rule-based algorithms to discover the temporal query patterns between different source data streams. In an embodiment, a rule may be generated according to the following rule:

> Whenever factor X has a value that satisfies some predicate P(X), then factor Y will have a value that satisfies a predicate P(Y), within a time span $\Delta t$, with confidence $\theta$.  Rule (1)

Accordingly, the incremental temporal correlation algorithms (e.g., such as graph pattern mining algorithms triggered by X and P(X)) establish causality between two triplets for a defined time span. A concept drifting detector monitors the point of change in the monitored data stream and decides when the overall model needs to be updated. As an example of implementing Rule (1), fuser 121 may develop a temporal correlation for a client A, server B and actuator C that states the following: whenever client A sends a certain number of packets to server B, then after 10 seconds, actuator C will have a signal change point event with 0.8 confidence.

In summary, the event entity extractors of framework 100 standardize the different streaming formats, which enables the fusion of information from different sources. A software stack of causality detection algorithms, anomaly detection algorithms, and entity extraction algorithms are integrated in the framework 100 by designing a lightweight specific data standardization and event entity extraction engine. It also establishes a baseline for single data streaming using normal operation data and performs cross correlation monitoring.

Figure 2:
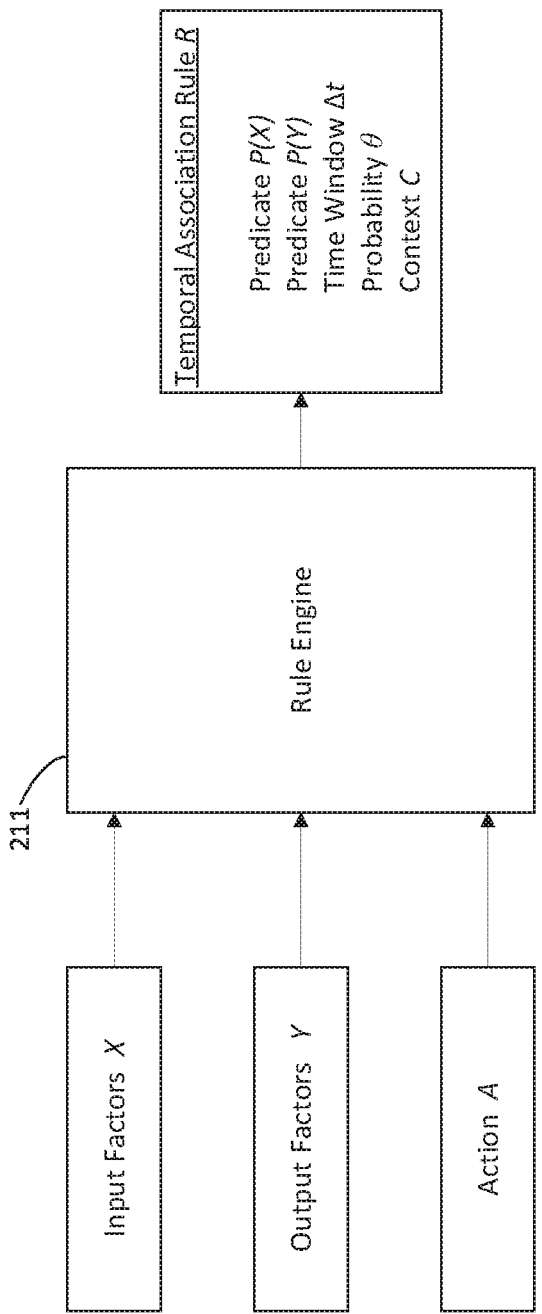
FIG. 2 shows a flowchart diagram for an example of a temporal correlation detection process for an Industrial Control System according to embodiments of this disclosure.

FIG. 2 shows a flowchart diagram for an example of a real-time temporal correlation detection process for an Industrial Control System according to embodiments of this disclosure. A rule engine 211 may be deployed in each of event entity extractors 130, 131, 132, 133 to perform a temporal correlation detection and fact checking based on input factors X, output factors Y and actions A. For example, if an event entity model is missing an expected link, the fact checking algorithm may determine whether there is a valid relationship for the expected link. The rule engine 211 processes the extracted data to discover complicated patterns and validate correctness of data. Correlation inference in static datasets may rely on Association and Bayesian models. However, for the relevant domain of the present disclosure, which relates to evolving streaming of ICS data, event entity models may "expire" or decay due to concept drift as the underlying samples and data changes. As a solution, rule engine 211 develops data stream association models within certain time intervals and lifespans, modeling temporal dependency as a set of temporal association rules that include contextual considerations. The time intervals or lifespans may be based on monitoring of the data distribution change (e.g., concept drifting) or may be a fixed time interval based on some domain knowledge. Application of context extends the correlation analysis to specify the condition for relating two factors, as some events might lead to other events under certain circumstances. Each factor is considered as a stream of values.

Given a set of heterogeneous input factors X and output factors Y, and an action A, a temporal association rule R is in the form of:

$$R: P(X) \rightarrow P(Y)[\alpha, \Delta t, \theta, C], \quad \text{Rule (2)}$$

which states:

> Whenever signal X has values that satisfy a predicate P(X) and an action a is performed, then Y will have values that satisfy a predicate P(Y), within time window $\Delta t$, with probability $\theta$ under context C.

where the context C specifies spatial-temporal-ontological scenarios for the association, and probability $\theta$ signifies a confidence (or significance) level.

Rule engine 211 may provide additional information for anomaly detection and root cause analysis. For example, when an ICS sensor is reporting abnormal readings, single analysis of the sensor data cannot distinguish whether it is a cyberattack or sensor fault. Using the rule engine 211 solves such an issue by providing a temporal association rule for the framework 100. For example, if framework 100 captures an event in which a programmable logic controller (PLC) sends a control command to an actuator while the collected sensor data does not satisfy the predefined rule, it could be a potential cyberattack with additional certainty supported by the correlated data and probability $\theta$.

Figure 3:
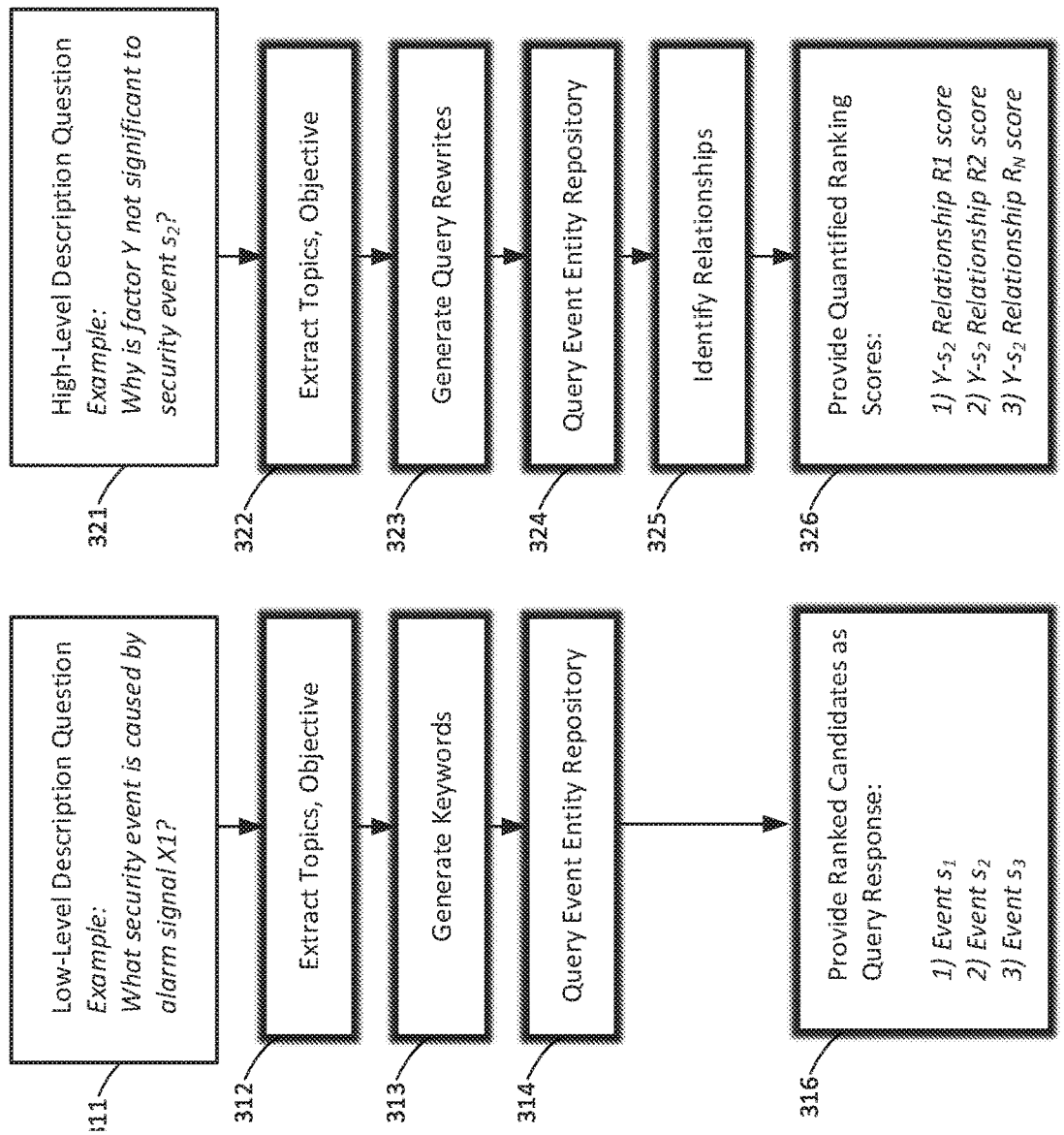
FIG. 3 shows an example of a user-friendly question-and-answer interface used for querying and ranking security events for an Industrial Control System according to embodiments of this disclosure

FIG. 3 shows a process flowchart for an example of a user-friendly question-and-answer interface used for querying and ranking security events for an Industrial Control System according to embodiments of this disclosure. During the linking of event entity models by framework 100, the user-friendly question-and-answer interface may be used to prompt an operator for validation and fact checking of detected data inconsistencies or to verify if applied constraints and rules for the event entity are valid. After the framework 100 has accumulated event entity models in the event entity repositories 111, 112, 113 following the extraction, linking and fusion processes, and a strong baseline is established for normal relational patterns, the user-friendly interface can be useful to an ICS system operator when one or more events prompt a need to make inquiries to ascertain if an anomalous condition is related to a potential cyberattack. The user-friendly interface may operate according to a user interface module programmed to bridge interpretation of answers from high-level questions to the underlying physical world via effective query rewriting. The user interface module may execute an interface process 300 for providing answers to two types of questions: a low-level description question that can be directly answered by querying and ranking the events, and high-level questions to the underlying physical world via effective query rewriting. In contrast to present day ICS and IT configurations to deliver anomalous data alerts, the fusion of ICS and IT event entity models by the framework 100 enables an operator to receive an event notification on the user-friendly interface with richer information, that may provide a probability or likelihood score for whether the event is caused by a process failure (e.g., ICS equipment needing maintenance) or an IT security breach (e.g., a hacker has modified a process variable in a malicious act to deceive control readings by an operator), which accelerates and simplifies a root cause analysis. Anomalous data alerts in conventional ICS and IT systems, on the other hand, require separate root cause investigations along the ICS system and the IT system to ascertain the meaning of the alert, and may even fail to link independent alerts coming from each system.

As shown in FIG. 3, an interface process 300 may be executed by the interface module, and includes a low-level description question 311 posed to the interface 300 can be answered by first extracting topics and an objective 312, generating a set of keywords 313 used to query the event entity repository 314 to obtain information directly from the knowledge base. In response to the query in the form of a low-level question, the keyword query may be processed by a system controller or processor that executes a searching algorithm to search the knowledge base and extract ranked candidates as a query response 316.

In an embodiment, the user interface module may execute an interface process 300 that includes a high-level description question 321 configured to answer two classes of questions, "why" and "why-not", for enhanced interpretation of an event. In response to the query, the user interface module may extract topics and an objective 322, generate query rewrites 323, query the event entity repository 324, identify relationships 325, and provide quantified ranking scores 326.

As a first example, given an event s with correlated signals X in the learned event model, the operator may want to understand "why are signals X critical?" (i.e., a "why" question). The user interface module implements a query rewriting that modifies this question to a new counterpart query, such that once transmitted, can trigger a retrieval of a relevant link between an unexpected signal X and the event, along with their significant relationships by retrieval of learned subgraph patterns in the model.

As a second example, given an event $s_2$ and suggested signals/factors, another type of question for the user interface module to process is "why another factor Y is not relevant to event s?" (i.e., a why-not question). This question regarding signals or factors suggested by an operator may arise independently from the previous example, or could arise as a follow up question to the previous example once provided with the answer to why signal X1 is related to the event. The user interface module can compute query rewrites 323, which may be a set of ranked new queries that include the factor Y as its answer. Using a searching algorithm, the new queries can be posed to the event entity repositories 324 to identify the relationships 325 between the missing factor Y and event $s_2$. The identified relationships may be ranked 326 according to quantified ranking scores R1, R2, . . . $R_N$ according to whether the factor Y is indeed critical. If ranking score indicates a critical relationship, the new query rewrites 323 and relationships 326 are returned to the operator. Otherwise, a difference comparison between the relationships between factor Y and event $s_2$ (based on the ranking score), and the relationships between suggested signals (e.g., such as signal X1 posed to the interface in the first example above) and event $s_2$, can be returned to answer why-not question. For example, if there is a significant difference between relationship of factor Y to event $s_2$ and signal X1's relationship to event $s_2$, then it can be concluded that factor Y is not critical to event $s_2$.

Additional examples of questions and answers that may be processed according to interface process 300 are as follows.

Q1: [online event detection] "What's the top two significant events happened at sensor 1 in the past 10 minutes, [given time window of 60 seconds]?"
    Input: Real-time Cyber-physical data/sensor streams.
    Output: Events occurred at particular data streams/sensors. represented as a complex entity, with a list of critical attribute values, and a list of associated temporal links with other significant signals.

Q2: [online event ranking] "Will the newly detected anomaly ranked high/suspicious? Given the experience of past 30 days." "What are current top 5 suspicious events?"
    Input: Real-time Cyber-physical data/sensor streams. A set of interested events to be monitored.
    Output: A list of automatically ranked events.

Q3: [online correlation analysis] "What are the groups of sensors/events that are densely correlated in the past 20 minutes?"
    Input: Real-time Cyber-physical data/sensor streams. Two or more sensors/events.
    Output: Groups of sensor/events.

Q4: [Interactive Knowledge base exploration and Q&A]. Questions & Answer interface:
    Q: "Kronos, tell me top 2 sensors with most suspicious activities in the past 2 hours".
    A: "PMU 1 and sensor 2 illustrated with top listed suspicious events".
    Q: "What's the correlation of these two sensors and others?"
    A: "sensor 2 receives network package from sensor 3 regularly."
    Q: "What's the most likely scenario?"
    A: "it's likely a spoofing attack".
    Output: a correlation pattern, explained by Kronos ontologies, relationships and facts.

Figure 4:
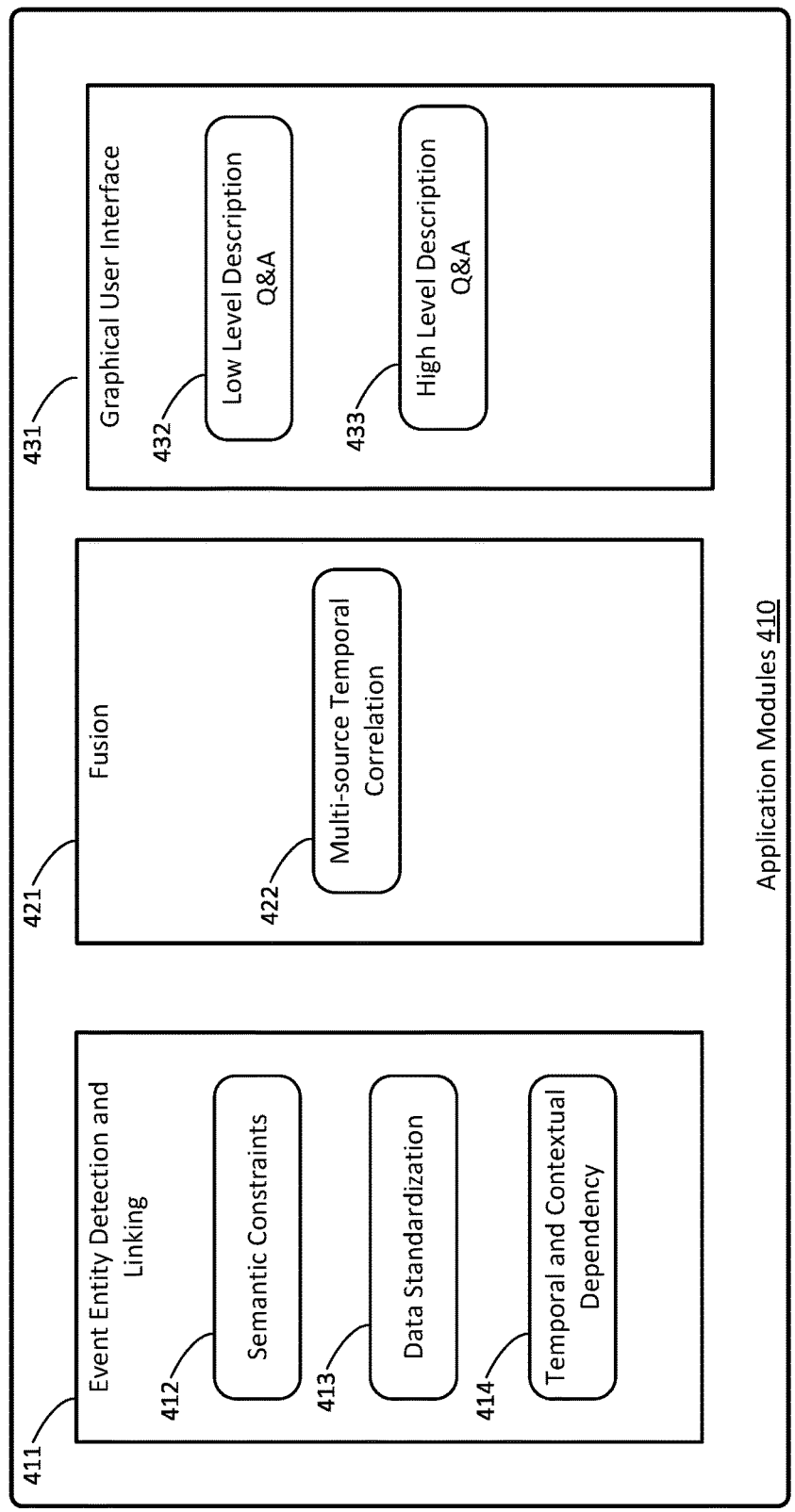
FIG. 4 shows a block diagram for an example of an application module set for executing real-time security event management and monitoring according to embodiments of this disclosure.

FIG. 4 shows a block diagram for an example of an application module set for executing real-time security event management and monitoring according to embodiments of this disclosure. Application modules 410 may include event entity linking module 411, fusion module 421, and graphical user interface module 431. The event entity linking module 411 may include a semantic constraints module 412 for developing semantic constraints to detect data inconsistencies by performing checks for whether event entity values of entity models violate the semantic constraints as described above. A data standardization module 413 may translate information from a domain knowledge base (e.g., design engineering documentation, P&ID drawings, or the like) using a machine learning application for validating constraints and adding new constraints. The temporal and contextual dependency module 414 may include a rule engine (e.g., rule engine 211) for linking event entities based on contextual and time correlation. The fusion module 421 may include a multi-source temporal correlation module 422 for executing ensemble learning based on temporal correlation rules, such as Rule (1) described above, for fusion of triples across event entity models of multiple data sources. The graphical user interface module 431 may include a low-level description Q&A module 432 and a high-level description Q&A module 433. The low level description Q&A module 432 may execute the process for "why" forms of questions such as steps 311-316 of FIG. 3, and the high-level description Q&A module 433 may execute the process for "why not" forms of questions such as steps 321-326 of FIG. 3.

The embodiments of this disclosure integrate various types of data source and data format for finding the correlation and causality relationship among different entities. As a result, when an anomaly is detected, additional information from other entities can help the framework to identify the root cause for it and differentiate the cyberattacks or physical fault. The graphical user interface module provides a user-friendly and context-rich message to operators for system monitoring, anomaly detection, and root cause analysis.

Figure 5:
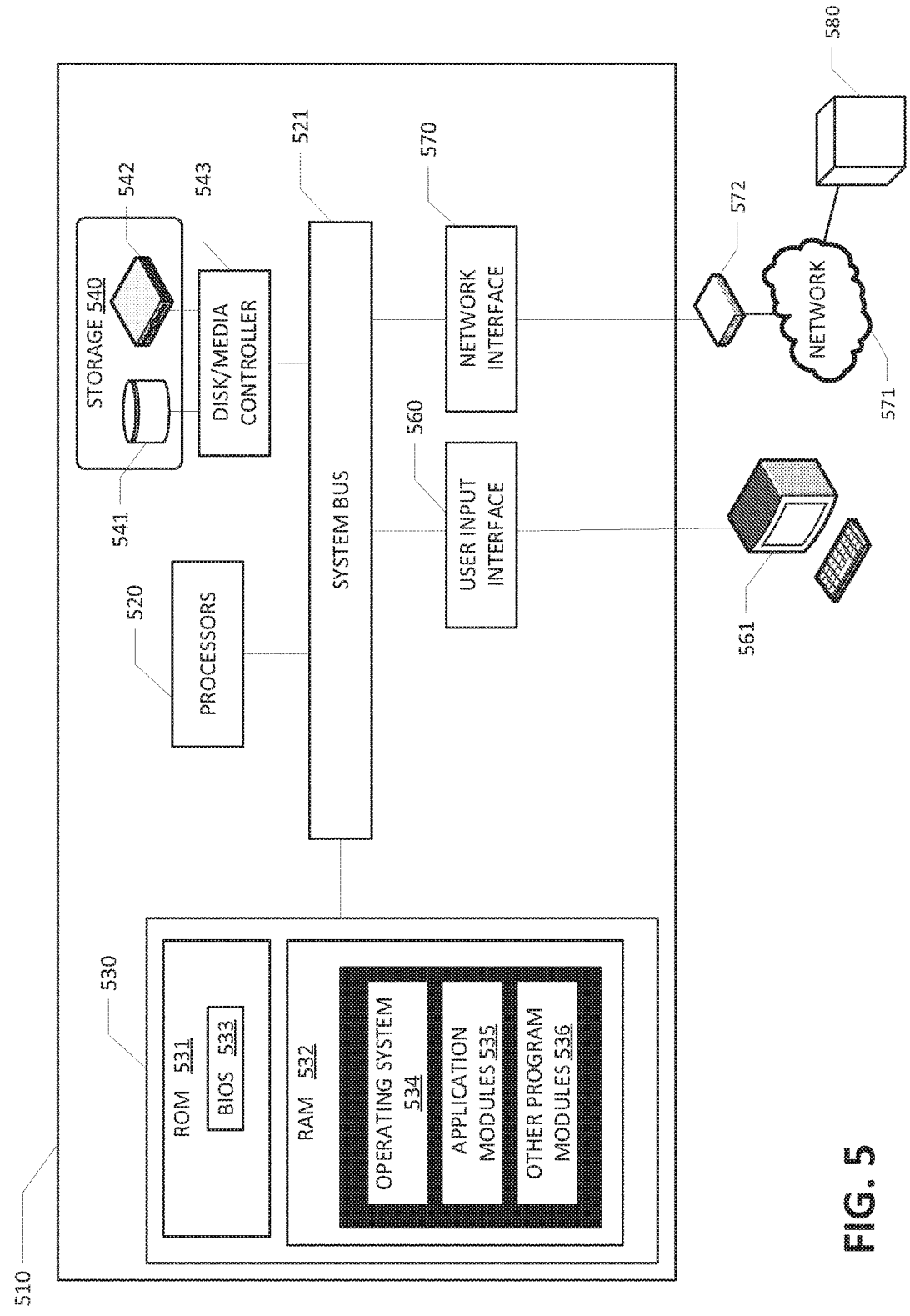
FIG. 5 shows an example of a computing environment within which embodiments of the disclosure may be implemented.

FIG. 5 illustrates an example of a computing environment within which embodiments of the present disclosure may be implemented. A computing environment 500 includes a computer system 510 that may include a communication mechanism such as a system bus 521 or other communication mechanism for communicating information within the computer system 510. The computer system 510 further includes one or more processors 520 coupled with the system bus 521 for processing the information. In an embodiment, computing environment 500 corresponds to a portion of an ICS, in which the computer system 510 relates to a central unit 301 described below in greater detail.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 5, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application modules 535, and other program modules 536. Application modules 535 may include aforementioned application modules 410 and may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may include a user input interface or graphical user interface (GUI) 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 520 may also be employed in a multi-processing arrangement to execute the one or more sequences of instructions contained in system memory 530. In alternative embodiments, hardwired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 500 may further include the computer system 510 operating in a networked environment using logical connections to one or more remote computers, such as remote computing device 580 and remote agents 581. In an embodiment, remote computing devices 580 may correspond to at least one additional central unit 301 in the ICS. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 5 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A security management system for an industrial control system, comprising:
  a processor; and
  a memory having a plurality of application modules stored thereon, comprising:
  an event entity detection and linking module configured to:
    generate a model for a plurality of event entities extracted from a plurality of different data sources that include at least one industrial control system data source and at least one information technology data source, wherein the model is a collection of triples encoding a set of linked event entities and the relationship between linked event entities, each event entity associated with a vector of attribute-value pairs;

perform data standardization of domain knowledge, comprising:
  extracting information from a domain knowledge base;
  translating, by a machine learning application, the extracted information into rules for constraints;
  using the rules to validate the constraints and to add new constraints; and
perform temporal and contextual correlation, comprising:
  developing data stream association models subjected to temporal dependency to control decay of the association models, and subjected to a context of spatial-temporal-ontological scenarios of the association; and
a fusion module configured to perform temporal correlation detection across data streams of the different data sources for establishing causality between triplets of association models within a defined time span;
wherein the domain knowledge base includes system design engineering documentation.

2. The system of claim 1, wherein the event entity detection and linking module is further configured to:
perform data inconsistency detection, comprising:
  detecting data inconsistencies based on violation of semantic constraints defined by conditional functional dependencies between attributes and values of linked event entity pairs;
  resolving detected data inconsistencies by removing linked attribute-value pairs or updating values associated with violation of the semantic constraints.

3. The system of claim 1, wherein
the at least one industrial control system data source provides data streams for configuration files, or process variable data of one or more field devices; and
the at least one information technology data source provides internet packets of an information technology system.

4. The system of claim 1, wherein the event entity detection and linking module comprises a temporal and contextual dependency module configured to:
generate a temporal association rule for input factors, input factor predicates, and output factors to satisfy output factor predicates within a time window constraint and under a context specifying spatial-temporal-ontological scenarios for the association.

5. The system of claim 4, wherein the temporal and contextual dependency module is further configured to:
perform a root cause analysis using the temporal association rule.

6. The system of claim 1, further comprising:
a graphical user interface module configured to process question and answer sessions for an operator, comprising:
  generating a set of keywords from a low-level description question to directly query the domain knowledge base; and
  rewriting a query from a high-level description question to a counterpart question that includes a missing factor to generate a quantified ranking score of relationships to verify if the missing factor is critical to an event.

7. The system of claim 6, wherein the graphical user interface prompts the operator for validation and fact checking of detected data inconsistencies during linking of event entities.

8. The system of claim 6, wherein the graphical user interface prompts the operator to verify if applied constraints and rules for the event entity are valid during linking of event entities.

9. A method for security management of an industrial control system, comprising:
generating a model for a plurality of event entities extracted from a plurality of different data sources that include at least one industrial control system data source and at least one information technology data source, wherein the model is a collection of triples encoding a set of linked event entities and the relationship between linked event entities, each event entity associated with a vector of attribute-value pairs;
performing data standardization of domain knowledge, comprising:
  extracting information from a domain knowledge base;
  translating, by a machine learning application, the extracted information into rules for constraints; and
  using the rules to validate the constraints and to add new constraints; and
performing temporal and contextual correlation, comprising:
  developing data stream association models subjected to temporal dependency to control decay of the association models, and subjected to a context of spatial-temporal-ontological scenarios of the association; and
performing temporal correlation detection across data streams of the different data sources for establishing causality between triplets of association models within a defined time span:,
wherein the domain knowledge base includes system design engineering documentation.

10. The method of claim 9, further comprising:
performing data inconsistency detection, comprising:
  detecting data inconsistencies based on violation of semantic constraints defined by conditional functional dependencies between attributes and values of linked event entity pairs;
  resolving detected data inconsistencies by removing linked attribute-value pairs or updating values associated with violation of the semantic constraints.

11. The method of claim 9, wherein
the at least one industrial control system data source provides data streams for configuration files, or process variable data of one or more field devices; and
the at least one information technology data source provides internet packets of an information technology system.

12. The method of claim 9, wherein the domain knowledge base includes system design engineering documentation.

13. The method of claim 9, further comprising:
generating a temporal association rule for input factors, input factor predicates, and output factors to satisfy output factor predicates within a time window constraint and under a context specifying spatial-temporal-ontological scenarios for the association.

14. The method of claim 13, further comprising:
performing a root cause analysis using the temporal association rule.

* * * * *